United States Patent
Burmeister et al.

[11] Patent Number: 6,150,017
[45] Date of Patent: Nov. 21, 2000

[54] PROCESS FOR PREPARING HIGH-PERFORMANCE PRESSURE-SENSITIVE HOTMELT ADHESIVE COMPOSITIONS AND THE USE THEREOF FOR PRODUCING SELF-ADHESIVE TAPES

[75] Inventors: Axel Burmeister, Hamburg; Heiko Leydecker, Neustadt; Jochen Stähr, Hannover, all of Germany

[73] Assignee: Beiersdorf AG, Hamburg, Germany

[21] Appl. No.: 09/006,765

[22] Filed: Jan. 14, 1998

[30] Foreign Application Priority Data

Jul. 17, 1997 [DE] Germany .................. 197 01 473

[51] Int. Cl.$^7$ ...................... B32B 5/00; C09J 5/06; C09J 201/00
[52] U.S. Cl. ................ 428/355 R; 526/931; 526/935; 462/901
[58] Field of Search ................ 520/1; 462/901; 264/240; 524/344, 351; 526/931, 935; 428/343, 346, 355 R

[56] References Cited

U.S. PATENT DOCUMENTS 5,914,157  6/1999  Munson et al. .................. 427/516

FOREIGN PATENT DOCUMENTS

94/11175  5/1994  WIPO .
95/25774  9/1995  WIPO .

*Primary Examiner*—Mark Kopec
*Attorney, Agent, or Firm*—Norris, McLaughlin & Marcus, P.A.

[57] ABSTRACT

Pressure-sensitive hotmelt adhesive composition based on non-thermoplastic elastomers, obtained by a) preparing, as the preliminary batch, a composition comprising the elastomers and one or more of the following additives such as fillers, anti-ageing agents, plasticizers and tackifier resins in an intensively shearing, intensively cooling mixer and without solvent, the composition having a final temperature of from 100° C. to 160° C., b) mixing and homogenizing the preliminary batch in a second mixer with one or more of the following additives such as fillers, anti-ageing agents, plasticizers and tackifier resins, without solvent, the composition having a final temperature of from 100° C. to 160° C., where the total residence time of the composition at temperatures over 100° C. does not exceed a figure of 6 minutes, so that the resulting hotmelt adhesive composition has a viscosity of more than 900 Pa*s, in particular from 900 Pa*s to 1200 Pa*s, at 130° C. and at a shear gradient of 100 $s^{-1}$.

15 Claims, No Drawings

PROCESS FOR PREPARING HIGH-PERFORMANCE PRESSURE-SENSITIVE HOTMELT ADHESIVE COMPOSITIONS AND THE USE THEREOF FOR PRODUCING SELF-ADHESIVE TAPES

The invention relates to high-performance pressure-sensitive hotmelt adhesive compositions and to the use of these hotmelt adhesive compositions for producing self-adhesive tapes.

Pressure-sensitive adhesives made from non-thermoplastic elastomers or rubbers are part of the prior art. They are processed with the aid of solvents. Alternatively, the adhesive can be produced from rubbers, by subjecting the rubber to mastication, although this restricts the adhesive properties of the subsequent adhesive composition. Both methods are found to be labour-intensive and materials-intensive, and the former in particular should nowadays no longer be chosen, just from the standpoints of ecology and safety. In addition, they feature a comparatively low throughput, which can be raised only by high-level deployment of apparatus and thus at high financial cost. A comprehensive review of the customary processing of rubbers into adhesive compositions is given in the book "Handbook of Pressure Sensitive Adhesive Technology" by Donald Satas, Van Nostrand, N.Y., 1989.

The use of natural rubber and other high molecular mass elastomers in pressure-sensitive hotmelt adhesives, on the other hand, has not become established to date. In the case of the customary hotmelt mixing and coating processes according to the present state of the art, the necessary throughput is not achieved and/or the rubber is so severely degraded that it is impossible to meet the requirements imposed on the resulting adhesive tapes, even with subsequent radiative crosslinking, while the use of the known, thermally reactive crosslinkers is ruled out owing to the necessarily very high processing temperatures.

For instance, WO 94/11175 describes a process which comprises a solvent-free hotmelt procedure for preparing a pressure-sensitive adhesive. In this procedure a non-thermoplastic elastomer is introduced into a continuous device in which the composition is alternately conveyed and masticated. Subsequently, in a further process step, a tackifying resin is added. The blend which is then prepared therefrom can be processed further, the blend comprising a pressure-sensitive adhesive which characteristically contains less than 10% by weight of plastifier. Mastication in particular subjects the non-thermoplastic elastomer to very high mechanical stress which inevitably leads to chemical breakdown of the compounds. This results in a definitive deterioration in the properties of the adhesive prepared by the process. This effect is intensified by the described process steps of in-line mixing and of the coating of the adhesive onto a backing in a twin-screw extruder, a coating operation which is emphasized as being particularly advantageous.

WO 95/25774 likewise discloses a solvent-free process for preparing a foamed, pressure-sensitive adhesive from a non-thermoplastic elastomer. However, in this process too the elastomer is subjected in the course of mastication, as a result of a plurality of mixing zones inter alia, to high thermal-mechanical stress, which undoubtedly leads to a disadvantageous breakdown of the elastomer.

The object of the invention was to provide a process with which it is possible to prepare, in particular from rubber, a pressure-sensitive hotmelt adhesive composition and to coat it onto backing materials without there being any property-altering degradation of the rubber in the course of implementation of the process.

This object is achieved by a pressure-sensitive hotmelt adhesive composition as described in more detail in claim 1. Advantageous embodiments and developments are the subject of the subclaims. The claims additionally embrace a self-adhesive tape which is produced with the aid of the pressure-sensitive hotmelt adhesive composition.

The pressure-sensitive hotmelt adhesive composition based on non-thermoplastic elastomers is prepared, accordingly, by the following process.

In the first process step, as a preliminary batch, a composition comprising the elastomers and one or more of the following additives such as fillers, anti-ageing agents, plasticizers and tackifier resins is prepared without solvent in an intensively shearing, intensively cooling mixer, the composition having a final temperature of from 100° C. to 160° C. In the second process step, the preliminary batch is mixed and homogenized without solvent in a second mixer with one or more of the following additives such as fillers, anti-ageing agents, plasticizers and tackifier resins, the composition having a final temperature of from 100° C. to 160° C. The total residence time of the composition at temperatures over 100° C. does not exceed a figure of 6 minutes. The resulting hotmelt adhesive composition has a viscosity of more than 900 Pa*s, in particular from 900 Pa*s to 1200 Pa*s, at 130° C. and at a shear gradient of 100 $s^{-1}$.

The above-described two-stage compounding process of the elastomers with the respective additives takes place in every case without a mastication step detrimental to the properties.

The non-thermoplastic elastomer is advantageously chosen from the group consisting of natural rubbers and synthetic rubbers or consists of a two-component blend of natural rubber/synthetic rubber or two synthetic rubbers, it being possible for the synthetic rubber or rubbers to be chosen from the group consisting of random-copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes.

It is also possible, preferably, to add thermoplastic elastomers with a proportion by weight of from 10 to 90 phr, preferably from 10 to 50 phr, to the pressure-sensitive hotmelt adhesive composition in order to improve the processing properties.

The pressure-sensitive hotmelt adhesive composition prepared in accordance with claim 1 is particularly suitable for producing a self-adhesive tape. To do this, the novel pressure-sensitive hotmelt adhesive composition is coated, in a third process step, onto a backing in web form using an applicator and without solvent, the uncrosslinked pressure-sensitive hotmelt adhesive composition after coating having a viscosity of more than 800 Pa*s, in particular from 800 Pa*s to 1200 Pa*s, at 130° C. and at a shear gradient of 100 $s^{-1}$. The self-adhesive tape produced in this way is suitable for service temperatures of up to 80° C., especially when used as masking tape. In addition to solvent-free processing of the composition that is to be used for coating, however, it is also possible to carry out coating from solution with the pressure-sensitive hotmelt adhesive composition. For this purpose, however, a solvent is added to the particular composition produced, either after the first process step or after the second process step.

The crosslinking of the self-adhesive composition by ionizing radiation advantageously takes place in-line with the third process step, i.e. that of coating onto a backing which is in web form, so that the self-adhesive tape is suitable for service temperatures of up to 120° C., especially when used as masking tape.

In a further preferred embodiment, in the second process step or in an additional process step after the second and before the third process step, a thermally activatable, chemical crosslinker is added directly to the hotmelt adhesive composition. Subsequently, after the third process step, the coated, pressure-sensitive hotmelt adhesive composition is crosslinked by means of heat, so that the self-adhesive tape is suitable for service temperatures of up to 160° C., especially when used as masking tape. Crosslinkers which can be employed are all thermally activatable, chemical crosslinkers known to date, such as sulphur accelerator systems, sulphur donors or accelerators, diisocyanates and/or vulcanization resins.

The pressure-sensitive hotmelt adhesive composition can also be crosslinked by means of a combination of ionizing radiation and chemical crosslinkers.

The first process step, the preparation of the preliminary batch, can take place in an internal mixer of the Banbury type, in a roll mill or in a continuous apparatus operating on the principle of the Farrel continuous mixer.

The Banbury internal mixer in particular ensures a high throughput of rubber coupled with minimal thermal damage of the polymers of the rubber. As an alternative, however, mixing can also take place in a discontinuous device.

The second process step, the finishing of the hotmelt adhesive composition, can take place in a mixer of the universal kneader type, in a twin-screw extruder or in an apparatus operating on the principle of the Farrel continuous mixer. As an alternative, however, mixing can also take place in a continuous device.

The third process step, the coating of hotmelt adhesive composition onto the backing material, can take place in a nozzle applicator or roll applicator in combination with an extruder.

Advantageously, the preliminary batch and the hotmelt adhesive composition are cooled to room temperature after the first and second process step. Consequently, temporary storage of the hotmelt adhesive composition is also possible.

In order to avoid the effect of oxygen the first two process steps can be carried out in an inert atmosphere, preferably under nitrogen.

The process described for preparing a novel hotmelt adhesive composition presents itself as a procedure which is very gentle to the polymer and which is notable for high throughput, low process temperatures and short residence times.

The process provides a pressure-sensitive hotmelt adhesive composition which is preferably formed from non-degraded rubbers or blends thereof. Also possible, however, are blends of non-degraded rubbers with degraded rubbers and/or TPE.

Finally, the pressure-sensitive rubber hotmelt has properties comparable with those of a solvent-based rubber composition.

The pressure-sensitive hotmelt adhesive composition is amenable to effective crosslinking by ionizing rays, without the use of promoters, and has properties comparable with those of a solvent-based rubber composition with a similar degree of crosslinking.

EXAMPLES

The table below indicates the formulations of the rubber mixtures described in the examples and the abbreviations which are used in the following text.

Formulations In PHR (Parts Per Hundred Rubber) By Weight

| | PB (prelim. batch) | HM (hotmelt) | HMT (hotmelt, crosslinkable) |
|---|---|---|---|
| NR Air Dried Sheets | 100 | 100 | 100 |
| Zinc oxide, active | 11.4 | 11.4 | 11.4 |
| Stearic acid | 1.1 | 1.1 | 1.1 |
| Escorez 1202 ® | | 43.6 | 43.6 |
| Dercolyte S115 ® | 20 | 20 | 20 |
| Resin 731 D ® | | 50.9 | 50.9 |
| Ondina G 33 ® | 8 | 8 | 8 |
| Lowinox AH 25 ® | 2.5 | 2.5 | 2.5 |
| Rhenogran S 80 ® | | | 3.1 |
| Rhenogran ZEPC 80 ® | | | 4.4 |
| Rhenocure HX ® | | | 0.5 |
| | 143 | 237.5 | 245.5 |

Example 1

Pressure-sensitive, Electron-beam-crosslinkable Rubber Hotmelt

Process Step 1: Preparing the Preliminary Batch

The preliminary batch was prepared, in accordance with the formulation designated PB, in a Banbury kneader from Werner & Pfleiderer, Stuttgart, Type GK 120 N, by the following mixing instructions:

Chamber and rotor conditioning: 60° C.

Blade rotational speed: 45 $\text{min}^{-1}$

| Run time [sec] | Operation |
|---|---|
| 0 | vent ram<br>filling of the kneader with the rubber<br>kneading of the rubber with closed ram to heat the material to 80° C. |
| 60 | vent ram<br>filling of the kneader with all other additives<br>kneading of the material up to a stock temperature of 120° C. |
| 180 | vent ram |
| 300 | emptying of the kneader<br>stock temperature 125° C. |

The preliminary batch was shaped by means of roll mills into continuous feed strips which were cooled in a batch- off unit customary in the rubber industry. The principle of the Banbury internal mixer ensures high throughput with minimal thermal damage to the polymers.

Process Step 2: Final Mixing of the Pressure-sensitive Rubber Hotmelt

In a kneader of type VI U 20 L from Aachener Misch- und Knetmaschinen-Fabrik Peter Küpper, Aachen, Germany, all further additives were added to the preliminary batch to give a pressure-sensitive rubber hotmelt corresponding to the composition HM.

The procedure in this case was in accordance with the following mixing instructions:

Chamber conditioning: 140° C.

Blade rotational speed: 30 $\text{min}^{-1}$

| Run time [sec] | Operation |
|---|---|
| 0 | filling of the kneader with the tackifier resins<br>heating of the material to 100° C. |
| 30 | filling of the kneader with the preliminary batch<br>kneading of the material up to a stock temperature of 140° C. |
| 400 | emptying of the kneader by means of the built-in conveying screw |

The resulting hotmelt adhesive composition was shaped by the conveying screw into a continuous feed strip, which after cooling to 25° C. was wound up between siliconized release paper layers.

Process Step 3: Coating of the Backing Material

A flat creped paper customary in the adhesive tape sector, treated with conventional release coating and conventional primer, was coated with the pressure-sensitive rubber hotmelt using a flexurally rigid calender roll applicator (roll diameter 300 mm, width 600 mm) from Windmüller & Hölscher. The pressure-sensitive rubber hotmelt was supplied by way of a melt extruder from Ingenieurgesellschaft W. Kiener jun. mbH, Lauchheim, Germany, at a barrel temperature of 100° C. and a screw temperature of 100° C. The screw had a length of 1150 mm and a diameter of 60 mm.

In the course of this process the following parameters were observed:

Coating speed: 100 m/min

Roll temperature: 150° C.

Temperature of the pressure-sensitive rubber hotmelt charge: 100° C.

Mass application: 40 g/m$^2$

The HM produced in this way and applied by coating is comparable in its performance with a solvent-based self-adhesive composition.

It was employed as masking tape for car body painting at moderate temperatures. It possesses high bond strengths which can be adjustable in a wide range through the known variations in formulation. After drying cycles up to 80° C./1 h, the adhesive tape can be redetached without residue from painted bodywork parts.

Process Step 4: Crosslinking

In addition, the HM prepared in this way and applied by coating is accessible to effective crosslinking by ionizing radiation with the aim of enhancing its performance. The coated paper backing was treated with electron beams.

At a radiation dose of 20 kGy and an acceleration voltage of 175 kV, the resulting masking tape can be redetached without residue from painted bodywork parts after drying cycles up to 120° C./1 h.

Example 2

Pressure-sensitive, Chemically Crosslinked Rubber Hotmelt

Through cool technology it becomes possible to use chemical crosslinkers, something which is not possible in conventional hotmelt technology owing to the high mixing and coating temperatures.

In the following example a sulphur/dithiocarbamate/amine accelerator system was used.

Process Step 1: Preparation of the Preliminary Batch

The preliminary batch is prepared in the same way as for the uncrosslinked HM.

Process Step 2: Final Mixing of the Pressure-sensitive Rubber Hotmelt

The mixing instructions are changed slightly relative to the uncrosslinked HM:

Chamber conditioning: 80° C.

Blade rotational speed: 30 min$^{-1}$

| Run time [sec] | Operation |
|---|---|
| 0 | filling of the kneader with the tackifier resins<br>heating of the material to 80° C. |
| 30 | filling of the kneader with the preliminary batch<br>kneading of the material up to a stock temperature of 95° C. |
| 300 | filling of the kneader with the cross-linkers<br>kneading of the material up to a stock temperature of 115° C. |
| 400 | emptying of the kneader by means of the built-in conveying screw |

Process Step 3: Coating of the Backing Material

The presence of thermal crosslinkers required lower coating temperatures. Relative to the uncrosslinked HM, the process parameters were changed.

In this process, the following parameters were observed:

Coating speed: 100 m/min

Roll temperature: 120° C.

Temperature of the pressure-sensitive rubber hotmelt charge 100° C.

Mass application: 40 g/m$^2$

Process Step 4: Crosslinking

The HM prepared in this way and applied by coating is comparable in its performance to a solvent-based self-adhesive composition, and after thermal crosslinking was suitable for a masking tape for car body painting at very high temperatures.

Crosslinking took place in a vulcanization tunnel with an effective residence time of 4 min/120° C. The masking tape produced in this way can be redetached without residue from painted bodywork parts after drying cycles up to 160° C./1 h.

What is claimed is:

1. Pressure-sensitive hotmelt adhesive composition based on non-thermoplastic elastomers, obtained by
   a) preparing, as the preliminary batch, a composition comprising the elastomers and one or more additives selected from the group consisting of fillers, anti-ageing agents, plasticizers and tackifier resins in an intensively shearing, intensively cooling mixer and without solvent, the composition having a final temperature of from 100° C. to 160° C.,
   b) mixing and homogenizing the preliminary batch in a second mixer with one or more additives selected from the group consisting of fillers, anti-ageing agents, plasticizers and tackifier resins, without solvent, the composition having a final temperature of from 100° C. to 160° C.,
where the total residence time of the composition at temperatures over 100° C. does not exceed 6 minutes, and
   c) adding a thermally activatable chemical crosslinking agent to the composition during or subsequent to step b),
so that the resulting hotmelt adhesive composition has a viscosity of from 900 Pa*s to 1200 Pa*s, at 130° C. and at a shear gradient of 100 s$^{-1}$.

2. Pressure-sensitive hotmelt adhesive composition according to claim 1, wherein the non-thermoplastic elastomer is selected from the group consisting of one or more natural rubbers, one or more synthetic rubbers and combinations thereof.

3. Pressure-sensitive hotmelt adhesive composition according to claim 2, wherein the synthetic rubber or rubbers are selected from the group consisting of random-copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes.

4. Pressure-sensitive hotmelt adhesive composition according to claim 1, wherein thermoplastic elastomers with a proportion by weight of from 10 to 90 phr, are added to the pressure-sensitive hotmelt adhesive composition in order to improve the processing properties.

5. Self-adhesive tape obtained by subjecting the pressure-sensitive hotmelt adhesive composition prepared according to claim 1 to d) solvent-free coating, with an applicator, onto a backing which is in web form, the uncrosslinked pressure-sensitive hotmelt adhesive composition after coating having a viscosity of more than 800 Pa*s at 130° C. and at a shear gradient of 100 s$^{-1}$, and the self-adhesive tape being suitable for service temperatures of up to 80° C.

6. Self-adhesive tape according to claim 5, wherein that the crosslinking of the self-adhesive composition takes place by ionizing radiation in-line with process step d), so that the self-adhesive tape is suitable for service temperatures of up to 120° C.

7. Self-adhesive tape according to claim 5, wherein, after step d) the crosslinking of the pressure-sensitive hotmelt adhesive composition takes place by means of heat, so that the self-adhesive tape is suitable for service temperatures of up to 160° C.

8. Self-adhesive tape according to claim 5, wherein the crosslinking of the pressure-sensitive hotmelt adhesive composition takes place by means of a combination of ionizing radiation and chemical crosslinkers, so that the self-adhesive tape is suitable for service temperatures of up to 160° C.

9. Self-adhesive tape according to claim 5, wherein step a) takes place in an internal mixer of the Banbury type, in a roll mill or in a continuous apparatus operating on the principle of the Farrel continuous mixer.

10. Self-adhesive tape according to claim 5, wherein process step b) takes place in a mixer of the universal kneader type, in a twin-screw extruder or in an apparatus operating on the principle of the Farrel continuous mixer.

11. Self-adhesive tape according to claim 5, wherein process step d) takes place in a nozzle applicator or roll applicator in combination with an extruder.

12. Self-adhesive tape according to claim 5, wherein preliminary batch and hotmelt adhesive compositions are cooled to room temperature after process step a and after process step b).

13. Self-adhesive tape according to claim 5, wherein in order to avoid the effect of oxygen, steps a) and b) are carried out in an inert atmosphere.

14. Self-adhesive tape according to claim 13, wherein said inert atmosphere is a nitrogen atmosphere.

15. Self-adhesive tape according to claim 5, wherein said viscosity is from 800 Pa*s to 1200 Pa*s.

* * * * *